(12) United States Patent
Graley

(10) Patent No.: US 6,895,056 B2
(45) Date of Patent: May 17, 2005

(54) DATA PROCESSING APPARATUS AND METHOD FOR PERFORMING AN ADAPTIVE FILTER OPERATION ON AN INPUT DATA SAMPLE

(75) Inventor: John Stansfield Graley, Cambridge (GB)

(73) Assignee: Arm Limited, Cambridge (GB)

( * ) Notice: Subject to any disclaimer, the term of this patent is extended or adjusted under 35 U.S.C. 154(b) by 654 days.

(21) Appl. No.: 10/058,418

(22) Filed: Jan. 30, 2002

(65) Prior Publication Data

US 2002/0136312 A1 Sep. 26, 2002

(30) Foreign Application Priority Data

Mar. 23, 2001 (GB) ............................................. 0107369

(51) Int. Cl.$^7$ ................................................ H04N 7/12
(52) U.S. Cl. .............................. 375/240.29; 375/240.26
(58) Field of Search ...................... 375/240.29, 240.26, 375/240.27, 240.18, 240.2; 708/402, 203; 382/275, 266, 264, 268

(56) References Cited

U.S. PATENT DOCUMENTS

| | | | |
|---|---|---|---|
| 5,812,200 A | * | 9/1998 | Normile ................. 375/240.12 |
| 6,249,610 B1 | * | 6/2001 | Matsumoto et al. ......... 382/232 |
| 6,535,148 B1 | * | 3/2003 | Kondo et al. .................. 341/50 |
| 6,539,060 B1 | * | 3/2003 | Lee et al. ............... 375/240.29 |

OTHER PUBLICATIONS

Kaup, A., Reduction of ringing noise in transform image coding using simple adaptive filters, Oct. 29, 1998, Electronics Letters, vol. 34 No. 22, pp. 2110–2112.*

Park, Hyun et al., A Postprocessing Method for Reducing Quantization Effects in Low Bit-Rate Moving Picture Coding, Feb. 1999, IEEE Transactions on Circuits and Systems for Video Technology, vol. 9 No. 1, pp. 161–171.*

* cited by examiner

*Primary Examiner*—Chris Kelley
*Assistant Examiner*—Matthew Haney
(74) *Attorney, Agent, or Firm*—Nixon & Vanderhye P.C.

(57) ABSTRACT

The present invention provides a data processing apparatus and method for performing an adaptive filter operation on an input data sample to generate an output data sample. In accordance with an adaptive filter operation, a logical computation is performed on a logical data item to determine whether a filtering computation should be applied to the input data sample. In accordance with the present invention the method comprises the steps of: (a) transforming the logical computation into an equivalent logical computation that incorporates the filtering computation; (b) storing the input data sample and the logical data item within a data word; (c) employing a data processing unit to apply the filtering computation to the data word, resulting in the data word containing a filtered data sample and a modified logical data item; (d) comparing the modified logical data item with predetermined criteria; and (e) outputting as the output data sample either the input data sample or a data sample derived from the filtered data sample, dependent on the comparison at said step (d). The present invention hence enables aspects of the logical computation to be performed simultaneously with the application of the filtering computation, and for the logical and filtering computations for a plurality of data samples to be performed simultaneously, which significantly improves the efficiency of the adaptive filter operation.

17 Claims, 6 Drawing Sheets

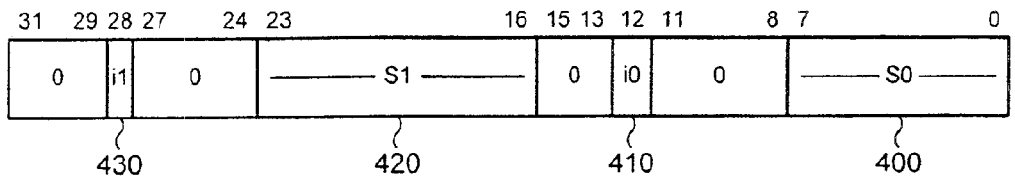
FIG. 4A
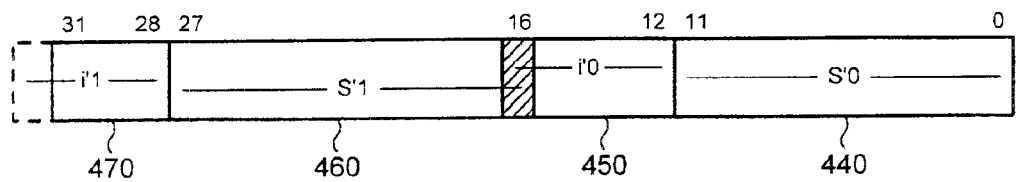
FIG. 4B
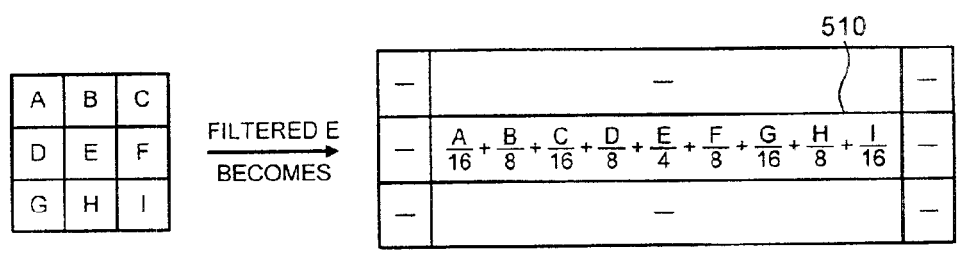
FIG. 5A
FIG. 5B

IF b d c e = 0

THEN OUTPUT $\dfrac{S'0}{16}$ OR $\dfrac{S'1}{16}$ RESPECTIVELY

DATA PROCESSING APPARATUS AND METHOD FOR PERFORMING AN ADAPTIVE FILTER OPERATION ON AN INPUT DATA SAMPLE

BACKGROUND OF THE INVENTION

1. Field of the Invention

The present invention relates to a data processing apparatus and method for performing an adaptive filter operation on an input data sample to generate an output data sample. An adaptive filter operation is one where a logical computation is performed on a logical data item to determine whether a filtering computation should be applied to the input data sample. Hence, the filtering computation will not typically be applied to every data sample, but instead will be applied to some data samples and not to others dependent on the logical computation performed in each case.

2. Description of the Prior Art

It will be appreciated that the use of adaptive filter operations may be required in a variety of different data processing applications. One example of an area where adaptive filter operations are used is in the area of image processing applications, where the input data samples to the adaptive filter operation represent data of an image pixel, for example intensity or chroma data relating to that image pixel. One particular image processing application where adaptive filter operations are used is when performing deringing of a decompressed image in order to reduce compression artefacts. It is often the case that images are compressed, for example prior to storage or transmission, and where the compression techniques are lossy, this can result in the decompressed image exhibiting certain compression artefacts. Ringing artefacts are one such type of artefact that may result from lossy compression techniques, such artefacts generally being visible to the eye, particularly in the more uniform areas of the image.

One example of an image compression technique which is lossy is MPEG-4 compression, and accordingly it is often desirable to perform a deringing operation after decompressing an MPEG-4 image. Specific details as to the decompression defined by the MPEG-4 standard, and the functions to be performed by deringing in order to be compatible with the MPEG-4 standard are provided in the MPEG-4 standard, "ISO/IEC 14496", Part 2 for video compression.

Deringing typically uses a logical rule to determine whether or not each pixel should be overwritten with the output of a 2D Finite Impulse Response (FIR) filter or left unchanged, and hence it can be seen that deringing involves an adaptive filter operation. Hence, for each pixel in turn, a typical deringing technique would first perform the logical rule or computation required to determine whether that pixel should be overwritten with the output of the FIR filter, and then if it is determined that the output should be overwritten, the FIR filter computation would be performed in order to generate a filtered data sample to output in place of the original pixel. Accordingly, it can be seen that the deringing process is processor intensive, since for each pixel the logical computation needs to be performed, followed by the filtering computation when determined that a pixel value should be overwritten with the output of the FIR filter. The deringing has to be performed in addition to the various other processing stages required in decoding an MPEG-4 image, and it is typically required that an image frame be produced many times a second, for example every fifteenth of a second.

Accordingly, it would be desirable to provide a technique for performing adaptive filter operations more efficiently.

SUMMARY OF THE INVENTION

Viewed from a first aspect, the present invention provides a method of performing an adaptive filter operation on an input data sample to generate an output data sample, where a logical computation is performed on a logical data item to determine whether a filtering computation should be applied to the input data sample, the method comprising the steps of: (a) transforming the logical computation into an equivalent logical computation that incorporates the filtering computation; (b) storing the input data sample and the logical data item within a data word; (c) employing a data processing unit to apply the filtering computation to the data word, resulting in the data word containing a filtered data sample and a modified logical data item; (d) comparing the modified logical data item with predetermined criteria; and (e) outputting as the output data sample either the input data sample or a data sample derived from the filtered data sample, dependent on the comparison at said step (d).

Hence, in accordance with the present invention the logical computation required to determine whether to apply the filtering computation is transformed into an equivalent logical computation that incorporates the filtering computation. Then, the input data sample and its corresponding logical data item are stored within a data word, for example by using an appropriate packing technique, after which the filtering computation is applied to the data word, resulting in the data word containing a filtered data sample and a modified logical data item. By comparing the modified logical data item with predetermined criteria, it can then be determined whether the output data sample should be merely the original input data sample, or a data sample derived from the filtered data sample.

Hence, in accordance with the present invention, aspects of the logical computation are performed simultaneously with the filtering computation, thereby significantly increasing the efficiency of the adaptive filter operation, particularly in the "worst case" scenario where the filtering computation has to be applied to a significant proportion of the data samples. The timings of the worst case scenarios are often very important, because they are most likely to cause an interruption in real-time performance of a final system.

By use of the present invention, the adaptive filter operation can typically be executed in fewer clock cycles than the earlier described prior art technique which thereby enables the speed of execution of the adaptive filter operation to be increased. As an alternative to increasing speed, it is also possible to reduce the clock frequency, such that the adaptive filter operation takes a similar time to complete as the prior art approach, but can be executed on a processing unit with a slower clock, thereby resulting in significant power consumption savings. Obviously, in any particular implementation, a balance can be struck between increasing the speed of operation, and reducing the power consumption.

In a typical prior art adaptive filter operation, the adaptive filter operation has to be performed for each input data sample in turn. However, in accordance with preferred embodiments of the present invention, a plurality of input data samples and corresponding logical data items are stored within the data word, whereby the filtering computation can then be applied simultaneously to a plurality of input data samples. Hence, preferred embodiments of the present invention employ a Single Instruction Multiple Data (SIMD)

type approach where multiple data values are packed into a single data word, and then a number of SIMD operations are applied to the data word. However, the use of SIMD type operations would generally be deemed unattractive in the context of adaptive filter operations where a logical computation is required to determine whether to overwrite each data sample with the output of the filtering computation. However, in preferred embodiments of the present invention, it has been found to be particularly beneficial, since aspects of the logical computation are performed in parallel with the filtering computation anyway, and accordingly significant speed benefits can be realised by employing such a SIMD type approach.

In such preferred embodiments where the filtering computation is applied simultaneously to a plurality of input data samples packed within the data word, then in preferred embodiments the steps (d) and (e) are performed independently for each data sample.

It will be appreciated that the predetermined criteria used at step (d) for comparing with the modified logical data item will depend on the form of the logical data item, and the conditions required to invoke overwriting of the input data sample with a data sample derived from the filtered data sample. However, in preferred embodiments, the predetermined criteria employed at said step (d) are the maximum and minimum values that the modified logical data item may take, the data sample derived from the filtered data sample being output at said step (e) if the corresponding logical data item has either the maximum or minimum value.

It will be appreciated that the exact placing of the input data sample and corresponding logical data item within the data word may vary as a matter of design choice. However, preferably the input data sample and corresponding logical data item are spaced apart from each other in the data word by a predetermined number of bits to allow for their values to increase during application of the filtering computation without interacting with each other.

The filtering computation may take a variety of forms. However, in preferred embodiments, the filtering computation involves application of a predetermined Finite Impulse Response (FIR) filter to the data word to generate for each input data sample a filtered data sample equivalent to the accumulation of that input data sample and adjacent data samples each multiplied by a predetermined integer coefficient.

It will be noted that in a typical FIR filter, integer coefficients are not used, and instead fractional coefficients are used. However, in accordance with preferred embodiments of the present invention, a fractional factor is extracted from all of the coefficients to convert the fractional coefficients into integer coefficients, with the reintroduction of the extracted fractional factor being deferred until a later step, so that it is no longer part of the filtering computation. This enables the spacing required between the input data sample and the corresponding logical data item within the data word to be more easily determined, since when integer coefficients are used with integer input data, the outputs will be integer and so no unwanted fractional bits will be introduced.

Since in preferred embodiments integer coefficients are used when applying the FIR filter, then preferably, if at said step (d) it is determined that the filtered data sample should be used to form the output data sample, then said step (e) includes the step of generating the data sample derived from the filtered data sample by dividing the filtered data sample by a predetermined factor to correct for the use of integer coefficients in the filtering computation.

In preferred embodiments, the FIR filter is actually formed by a plurality of cascaded filters which are applied one after the other to the data word. It has been found that this approach enables faster application of the FIR filter to the data word.

As mentioned earlier, there are many applications where adaptive filter operations are required. However, in preferred embodiments the adaptive filter operation is applied as part of an image processing application, each input data sample representing data of an image pixel. Hence, an input data sample may represent, for example, intensity or chroma data of an image pixel.

One particular image processing application where use of the present invention is particularly beneficial is where the adaptive filter operation is used to perform deringing of a decompressed image to reduce compression artefacts. More particularly, in preferred embodiments, the adaptive filter operation may be used to perform deringing of an MPEG-4 decompressed image, the logical data item for each input data sample being an index value generated by comparing the input data sample with a predetermined threshold value, the index value being set to a first or a second logic value dependent on the comparison. Hence, as an example, if the input data sample is greater than or equal to the threshold value, then its corresponding index value may be set to a logic one value, whereas otherwise the index value may be set to a logic zero value.

In one particular embodiment of the present invention, the data word is 32 bits long, each input data sample is 8 bits long, and each index value is 1 bit long, said step (b) comprising the storing of a first and second input data sample and their corresponding index values within the 32 bit data word, and wherein each input data sample is spaced apart from its corresponding index value in the data word by four spacing bits, with three spacing bits separating the index value of the first input data sample from the second input data sample stored in the data word.

In such embodiments, the spacing bits will have a known value, and in preferred embodiments the spacing bits are all set to a logic zero value.

In the above described particular embodiment, when an FIR filter is used that employs integer coefficients, the integer coefficients used in the filtering computation are such that the filtered data samples and modified logical data items may be up to a factor of sixteen times larger than the corresponding input data samples and logical data items, the method further comprising the step of, if it is determined at said step (d) that the filtered data sample produced from the first input data sample should be output, applying an operation to correct the filtered data sample produced from the second input data sample if the modified logical data item corresponding to the first input data sample has its maximum value.

Such a correction is needed since in this specific embodiment the index value is only allocated 4 bits to expand into, whereas a value of 16 requires 5 bits (i.e. 10000). Hence, in the event that the modified index value corresponding to the first input data sample has its maximum value, this will result in a logic one value being added to the filtered data sample produced from the second input data sample, and accordingly appropriate correction by subtracting one from that filtered data sample will be required.

Viewed from a second aspect, the present invention provides a data processing apparatus for performing an adaptive filter operation on an input data sample to generate an output data sample, where a logical computation is performed on a logical data item to determine whether a filtering computation should be applied to the input data sample, the logical computation being transformed into an equivalent logical computation that incorporates the filtering computation, the apparatus comprising: a storage for storing a data word containing the input data sample and the logical data item; a data processing unit for applying a sequence of data processing operations to: (i) construct the data word containing the input data sample and the logical data item; (ii) apply the filtering computation to the data word, resulting in the data word containing a filtered data sample and a modified logical data item; (iii) compare the modified logical data item with predetermined criteria; and (iv) output as the output data sample either the input data sample or a data sample derived from the filtered data sample, dependent on the comparison at said step (iii).

Viewed from a third aspect, the present invention provides a computer program operable to configure a data processing apparatus to perform a method in accordance with the first aspect of the present invention. The present invention also relates to a carrier medium comprising a computer program in accordance with the third aspect of the present invention.

BRIEF DESCRIPTION OF THE DRAWINGS

The present invention will be described further, by way of example only, with reference to a preferred embodiment thereof as illustrated in the accompanying drawings, in which:

FIG. 4A is a diagram schematically illustrating how the input data samples and corresponding index values are packed into a 32 bit word prior to application of the filtering computation, in accordance with a preferred embodiment of the present invention;

FIG. 4B is a diagram schematically illustrating the contents of the data word following application of the filtering computation;

FIGS. 5A and 5B schematically illustrate the FIR filter used in preferred embodiments of the present invention;

DESCRIPTION OF A PREFERRED EMBODIMENT

For the purpose of describing a preferred embodiment of the present invention, the process of deringing an MPEG-4 decompressed image will be considered.

Deringing uses a logical rule to determine whether or not each pixel should be overwritten with the output of a 2D FIR filter, or left unchanged, and accordingly it can be seen that deringing involves application of an adaptive filter operation. The logical rule, or logical computation as it will be referred to herein, performs the following steps:

Compare each input data sample value with a known threshold value, and set an index value $i(x, y)$ to 1 if sample>=threshold, else set the index value to 0.

Then for each pixel, add index values from the block of 9 pixels centred on the current pixel.

In other words compute $i(x-1,y-1)+i(x,y-1)+i(x+1,y-1)+i(x-1,y)+i(x,y) +i(x+1,y)+i(x-1,y+1)+i(x,y+1)+i(x+1,y+1)$ If this total is 0 or 9, apply the FIR filter to this pixel, otherwise leave the pixel unmodified.

The FIR filter has coefficients as follows:

$1/16$ $2/16$ $1/16$
$2/16$ $4/16$ $2/16$
$1/16$ $2/16$ $1/16$

Figure 1:
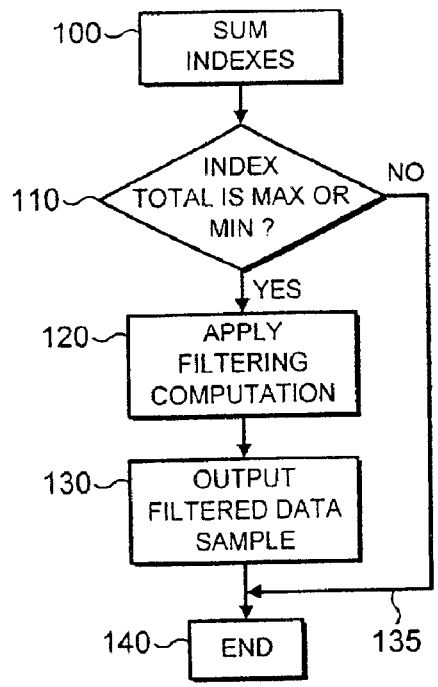
FIG. 1 is a flow diagram illustrating a prior art technique for applying an adaptive filter operation.

The above known deringing process is illustrated schematically by the flow diagram of FIG. 1, which shows a typical prior art approach. As can be seen from FIG. 1, at step 100 the index values from the block of 9 pixels centred on the current pixel are added, and then at step 110 it is determined whether the index total is at the maximum or minimum value, in this case 9 or 0. If it is, then the process proceeds to step 120, where the filtering computation is applied, i.e. the FIR filter is applied. Then at step 130, the filtered data sample is output and overwrites the original input data sample. However, if at step 110, it is determined that the index total is not 0 or 9, then the process branches over path 135 to step 140, where the process ends.

The above process is typically repeated for each pixel in turn.

Figure 2:
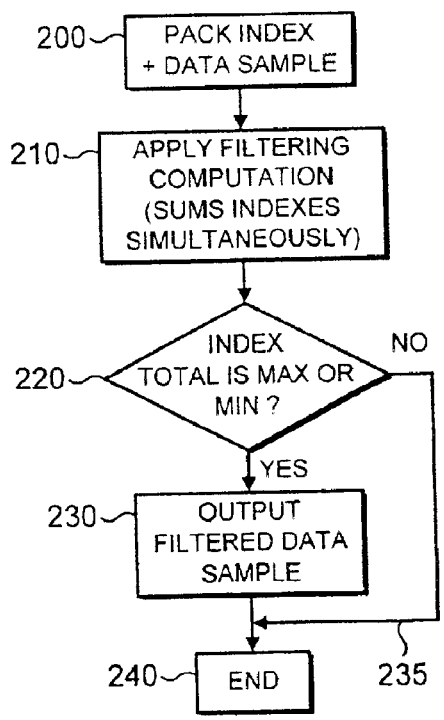
FIG. 2 is a flow diagram schematically illustrating an embodiment of the present invention used to apply an adaptive filter operation.

FIG. 2 is a flow diagram schematically illustrating the process employed in preferred embodiments of the present invention. Firstly, as will be discussed in more detail with reference to some of the later diagrams, an input data sample and its corresponding index are first packed into a data word at step 200. Then, at step 210, the filtering computation is applied to the data word, which in addition to producing a filtered data sample from the input data sample, also produces a weighted sum of the index values of the nine pixels centred on the current pixel. This weighted sum will be discussed in more detail later, but it should be noted at this point that the weighting arises as a result of the coefficients being used by the FIR filter.

Then, at step 220, it is determined whether the index total is at the maximum or minimum value. It should be noted that is no longer 9 or 0, given the weighting applied to the summing performed as part of step 210. As will be discussed in more detail later, in preferred embodiments, the maximum value will be sixteen, and the minimum value zero, and accordingly at step 220 it is determined whether the index total is sixteen or zero. If the index total is sixteen or zero, then the process proceeds to step 230, where a data sample derived from the filtered data sample is output. At this stage, there is no need to apply the filtering computation to determine that filtered data sample, since that has already occurred earlier at step 210 simultaneously with the generation of the weighted sum of the index values. If, at step 220, it is determined that the index total is not sixteen or zero, then the process branches over path 235 to step 240, where the process ends.

As with the prior art approach of FIG. 1, the process of FIG. 2 can be repeated for each pixel in the image. However, as will be discussed in more detail later, in preferred embodiments a plurality of input data samples and their corresponding index values are packed into the data word at step 200, such that the process of FIG. 2 is used to simultaneously process a plurality of pixels at one time.

Looking at both FIGS. 1 and 2, the slowest ("worst") case for either flow diagram is when all of the pixels need the filtering computation to be applied to them, and therefore the process branches down the "yes" path from decision blocks 110 and 220, respectively. The FIG. 2 approach of the preferred embodiment is clearly significantly faster in this case, since rather than having to sum the index values separately to applying the filtering computation (as per steps 100 and 120 in FIG. 1), these two processes are performed simultaneously at step 210. Given the diagrams of FIGS. 1 and 2, it is not immediately apparent that the FIG. 2 approach would give any advantage in the case where the index total is not at the maximum or minimum value, and accordingly the process branches down the "no" path from steps 110 and 220, respectively. However, in preferred embodiments, the process of FIG. 2 still turns out to be significantly faster, because of the ability to process more than one pixel at the same time. Moreover, in general, it should be noted that worst case timings are the most important, because they are most likely to cause an interruption in real-time performance of a final system.

Figure 3:
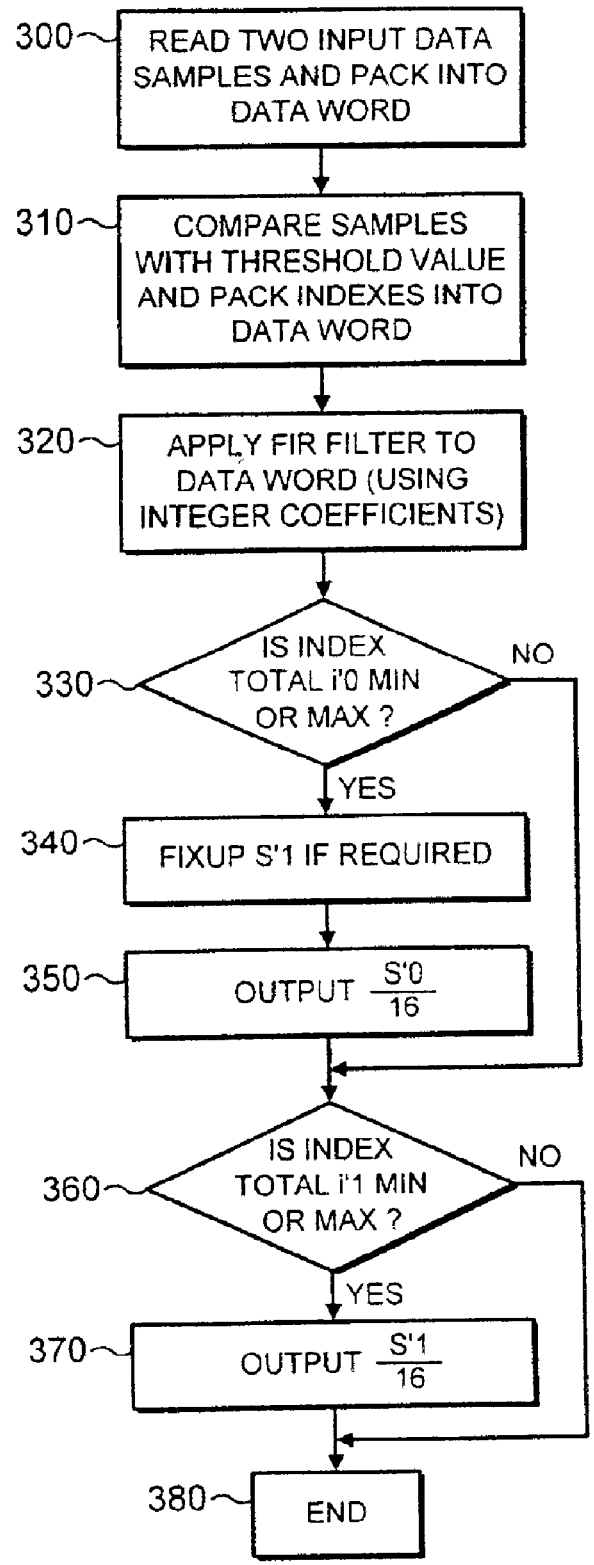
FIG. 3 is a flow diagram illustrating in more detail the adaptive filter operation applied in accordance with a preferred embodiment of the present invention.

FIG. 3 is a more detailed flow chart of the process employed in preferred embodiments of the present invention to perform deringing, where two input data samples (i.e. samples from two pixels) are processed at the same time. Before discussing FIG. 3 in detail, it should be noted that any two pixels can be processed at the same time in accordance with the FIG. 3 process, and hence there is no requirement, for example, for the two pixels to be close to each other. Indeed, in preferred embodiments, the pixels will be separated from each other so as to ensure that the regions subject to the FIR filtering algorithm do not overlap.

At step 300, the two input data samples are read and packed into the data word. In preferred embodiments, the input data samples are 8-bit samples, and the data word is 32-bits long, and accordingly this will result in two 8-bit samples being stored within the 32-bit data word. However, it will be appreciated that these are merely examples, and the same process can be applied for different length data samples and different length data words, for example two 16-bit data samples might be packed into a 64-bit data word.

At step 310, each of the two input data samples are compared with a predetermined threshold value to determine the corresponding index value, and the two index values are then packed into the data word. In preferred embodiments, as will be appreciated by those familiar with the MPEG-4 standard, the threshold value is set for each square block of 8 by 8 pixels, and is chosen to be a value which is half way between the lightest and darkest pixels in that block of 64 pixels. If the particular data sample being studied has a value which is greater than or equal to the threshold value, then the index value is set to one, otherwise the index value is set to zero.

In preferred embodiments, the data word after application of the process at step 310 is schematically illustrated in FIG. 4A. Hence, the first input data sample S0 is stored at bit positions 0 to 7, and the corresponding index value i0 is stored at bit position 12. Similarly, the second input data sample 420 is stored at bit positions 16 to 23, with the corresponding index value 430 being stored at bit position 28. Spacing bits are placed in bit positions 8 to 11, 13 to 15, 24 to 27 and 29 to 31, which in preferred embodiments are set at a logic zero value.

As will be discussed in more detail later, the reason for the spacing bits between the data items packed into the data word is because the FIR processing stage will make the data items grow in size, and it is desired to minimise the extent to which they "collide" within the data word (fix up code generally being required to "untangle" such bits). In preferred embodiments, the packing of the relevant data items within the data word is generally done using the following instruction:

ORR $R_{SIMDword}$, $R_{SIMDword}$, $R_{ValueToPack}$, LSL #DesiredBitPosition

Hence, the inputs to the instruction are the register containing the data word, referred to as $R_{SIMDword}$ and the register containing the data item to be packed, referred to as $R_{ValueToPack}$. The data item in the register $R_{ValueToPack}$ is then shifted left by the desired bit position and added into the contents of the register containing the data word, with the result then being provided in that register, i.e. in register $R_{SIMDword}$.

Returning to FIG. 3, after packing the data items into the data word as shown in FIG. 4A, the FIR filter is then applied to the data word at step 320. FIGS. 5A and 5B illustrate in more detail the form of the FIR filter used in preferred embodiments. As shown in FIG. 5A, when applying the FIR filter to the data sample for pixel E, the data samples in the nine pixels centred on pixel E have to be considered. In particular, the filtered data sample required is given by the equation illustrated in box 510 of FIG. 5A.

However, in accordance with preferred embodiments of the present invention, a factor of 1/16 is extracted from all of the coefficients, thereby making the coefficients integer coefficients. The "divide by sixteen" process is then postponed until later in the process of FIG. 3, so that it is no longer part of the FIR filter process. This is illustrated by FIG. 5B, where the fractional coefficients 520 are replaced by integer coefficients 530, with the requirement for a later "divide by sixteen" to take place. The reason for taking this step is to simplify the spacing requirement of the data items 400, 410, 420 and 430 packed within the data word as illustrated in FIG. 4A. By using integer coefficients, it is clear that each of the data items will grow in size as a result of application of the FIR filter, and it is clear that in the preferred embodiment the maximum gain of each data item will be sixteen.

Hence, after application of the FIR filter at step 320 of FIG. 3, the contents of the data word will be as shown in FIG. 4B. Hence, the filtered data samples S'0 and S'1 440 and 460 will now be 12 bits long, and be provided in bit positions 0 to 11 and 16 to 27 of the data word. Further, the corresponding modified index values i'0 and i'1 450 and 470 will now have extended to 5 bits in length. i'0 will hence be in bit positions 12 to 16, and the least significant 4 bits of i'1 will be in bit positions 28 to 31. As is clear from FIG. 4B, the top bit of the modified index value i'1 is lost, but as will become clear from the later discussion, this bit is not needed anyway. Further, as is clear from FIG. 4B, a potential collision occurs at bit position 16 between the modified index value i'0 and the filtered data sample s'1. It will appreciated that the only time that there will actually be a collision is when the modified index value i'0 has its maximum value, i.e. 16, in which case there will be a logic one value at bit position 16, which will alter the value of s'1. However, as will be discussed later, this problem can readily be dealt with using fix up code.

It should also be noted that as the original input data sample can have a maximum value of 255, the value of the filtered data sample s'1 will not overflow its allocated 12 bits, even if the upper bit of i'0 is at a logic one value, since the value 255×16+1 still fits into a 12 bit number.

Figure 6A:
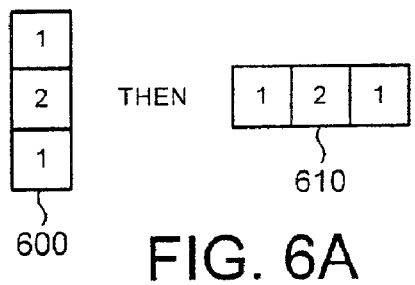
FIGS. 6A to 6C illustrate examples of how the filter illustrated in FIG. 5B can be factorised, that is converted into a few simpler filters that are run in "cascade"
Figure 6B:
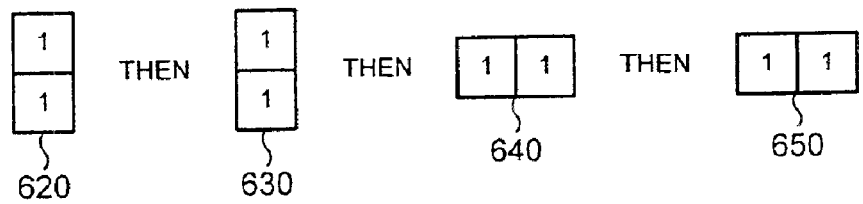
Figure 6C:
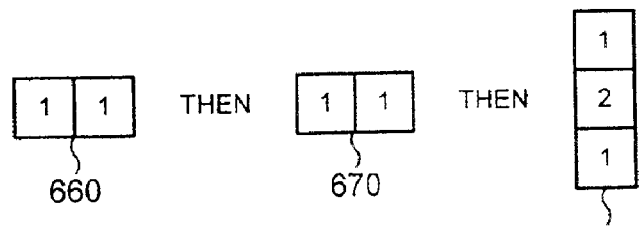

Before moving on from the description of the FIR filter, it should be noted that the FIR filter itself can be factorised, that is converted into a few simpler filters that are all run in "cascade", i.e. one after another. Three examples of suitable cascade filters are given in FIGS. 6A, 6B and 6C. Application of such a plurality of cascaded filters will give the same result as application of the original FIR filter 530, but will typically generate the result faster. In preferred embodiments, the three cascaded filters 660, 670 and 680 of FIG. 6C are used.

Returning now to FIG. 3, after application of the FIR filter at step 320, the process proceeds to step 330, where it is determined whether the index total i'0 is at a minimum or maximum value. Since the index values have been passed through the FIR filter, the sum is a weighted sum rather than a simple one. So i' has been calculated as i'=i(x−1,y−1)+2*i(x,y−1)+i(x+1,y−1)+2*i(x−1,y)+4*i(x,y)+2*i(x+1,y)+i(x−1,y+1)+2*i(x,y+1)+i(x+1,y+1) and the condition to over-write becomes i' equal to 0 or 16. This is equivalent to the least significant 4 bits of i' being equal to 0. It should be noted that all other values in the range, i.e. values 1 to 15 will not have all of the lowest 4 bits equal to zero.

Figure 7:
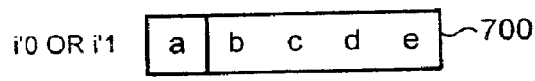
FIG. 7 illustrates how the values of the modified index values can be interpreted to determine whether they are at a maximum or minimum value in accordance with preferred embodiments of the present invention.
Figure 7:
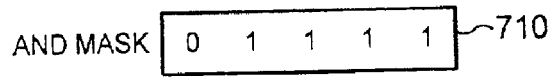
Figure 7:
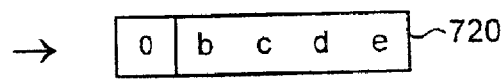

Accordingly, the test required at step 330 can be performed by use of a mask as illustrated in FIG. 7. In particular, the 5 bit modified index value 700 is combined with a mask having a value 01111 using a logical AND operation which gives a value 720 in which the most significant bit is zero, and the least significant 4 bits are equivalent to the least significant 4 bits of the modified index value, illustrated in FIG. 7 as values "b c d e". If "b c d e" is equal to zero, then this means that the index total i'0 does have the minimum or maximum value, and accordingly the process branches to step 340 where the value of s'1 is fixed if required. Fix up code used in preferred embodiments to perform step 340 is as follows:

| TST | $R_{anyFIRinput}$, #1 << 12 |
| SUBNE | $R_{FIRoutput}$, $R_{FIRoutput}$, #1 << 16 |

It will be appreciated that if the modified index value i'0 is to have its maximum value, then all of the relevant index values subject to the weighted sum performed by the FIR filter must have been at a logic one value. Accordingly, all that is required is to ensure that one of the original data words used in the computation and stored in a particular register is kept, so that the value of the index value stored within the data word at bit position 12 can be determined. Accordingly, the TST instruction retrieves the value at bit position 12 from a register containing any FIR input data word and determines whether that value is a zero or a one. If it is a zero, then an EQ flag will be set, whereas otherwise it will not be set.

The SUBNE instruction is then performed. It will be appreciated that if bit position 12 was a zero, no further action is required, since the index total i'0 must have been at the minimum rather than the maximum value, i.e. the most significant bit will be a zero, and accordingly will not have affected the value of s'1. In this case, the SUBNE instruction will not perform any subtraction because the EQ flag will have been set. However, if the bit position 12 value is a logic one value, then the SUBNE instruction will perform the subtraction, which subtracts a value of one from bit position 16 of the register containing the FIR output data word, that being the data word illustrated in FIG. 4B.

Once the above described fix up process has been performed, the process proceeds to step 350, where the filtered data sample S'0 divided by 16 is output for overwriting the original input data sample.

The process then proceeds to step 360, where it is determined whether the index total i'1 is at the minimum or maximum value. As discussed earlier with reference to FIG. 4B, the most significant bit of i'1 has been lost, but as was clear from FIG. 7 this is not needed in order to perform the test required at step 360. Accordingly, if the index total i'1 is at the minimum or maximum value, then the least significant 4 bits of i'1 as present in bit positions 28 to 31 will all be zero. If the test performed at step 360 does identify that the index total is at the minimum or maximum value, then the process branches to step 370, where the filtered data sample S'1 divided by 16 is output to overwrite the original input data value. Otherwise, the process branches directly from step 360 to 380, where the process ends.

Figure 8A:
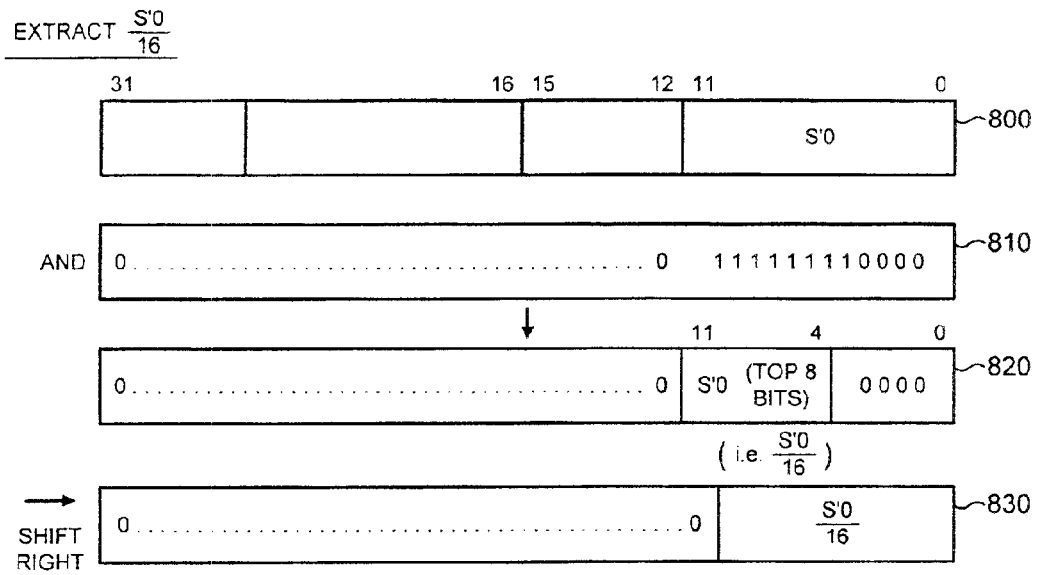
FIGS. 8A and 8B illustrate how the filtered data samples can be extracted from the data word for outputting as the output data sample in accordance with preferred embodiments of the present invention.
Figure 8B:
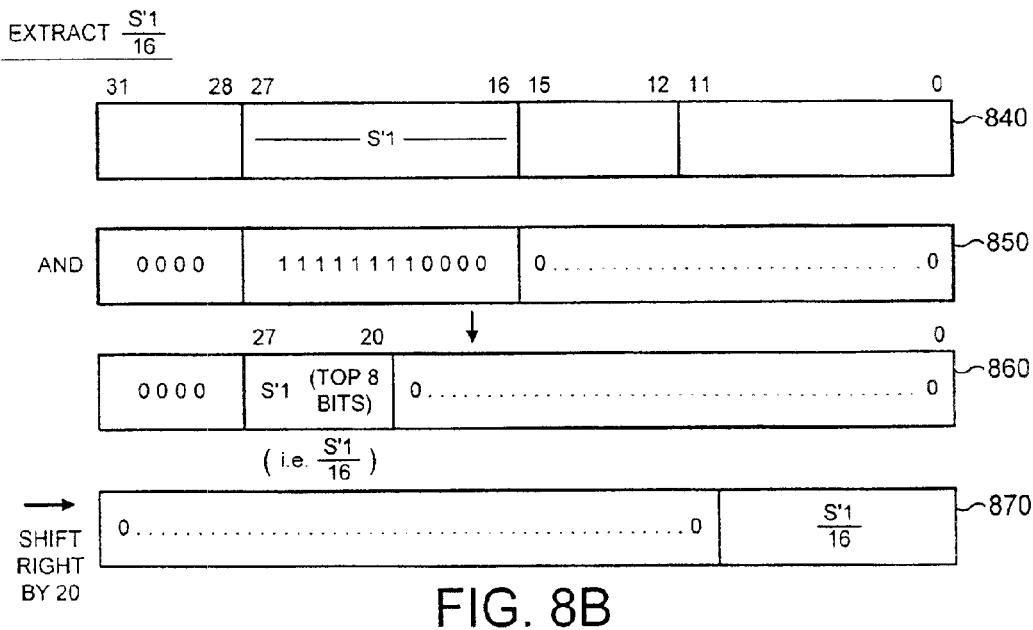

The process of outputting either S'0 divided by 16 or S'1 divided by 16 at steps 350 and 370, respectively is illustrated in FIGS. 8A and 8B. To divide a 12 bit number by 16 is equivalent to extracting merely the eight most significant bits of the number, and accordingly the divide by 16 required at steps 350 and 370 can be obtained directly by use of an appropriate mask.

Accordingly, as shown in FIG. 8A, when extracting S'0 divided by 16 from the data word 800, the data word is first ANDed with mask 810 which produces a modified data word 820 containing S'0/16 at bit positions 4 to 11. This data value can then be extracted merely by performing a shift right function to shift the data right by 4 bits, whereby the value of S'0/16 is given within data word 830.

A similar function can be performed at step 370 to extract the data value S'1/16. In this case, the original data word 840 is ANDed with the mask 850, to produce a data word 860 where the value S'1/16 is given at bit positions 20 to 27. A shift right by 20 bits is then performed to generate a data word 870 in which S'1/16 is contained.

It should be noted that in preferred embodiments, to avoid bias errors due to truncation, a value of 8 is preferably added to each filtered data sample S'0 and S'1 before the extraction process illustrated in FIGS. 8A and 8B. As will be appreciated by those skilled in the art, this is done to incorporate a round to nearest function. 8/16 is a half, so this process is really an add-½-then-truncate process.

Figure 9:
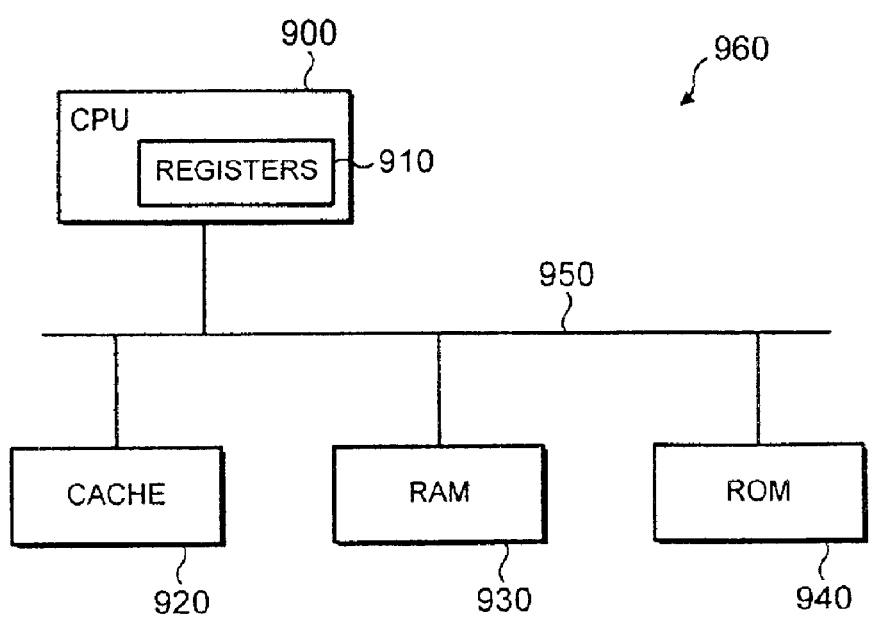
FIG. 9 is a block diagram schematically illustrating a data processing apparatus in which the technique of the present invention can be employed.

FIG. 9 is a block diagram schematically illustrating a data processing apparatus 960 in which the preferred embodiment of the present invention may be employed. A central processing unit 900 is connected via one or more buses 950 to a cache 920, a RAM 930 and a ROM 940. Within the CPU 900, a number of working registers 910 are provided for temporarily storing data being manipulated by the CPU. The deringing code used in preferred embodiments of the present invention is preferably stored in ROM 940, and retrieved by the CPU 900 for execution therein. The application of the FIR filter is in preferred embodiments done using adder circuitry within the CPU 900. Both the input data samples and the output data samples are preferably stored within the RAM 930 and the index values are calculated by the CPU 900 and temporarily stored in packed registers within the CPU registers 910, or within the cache 920.

It will be appreciated that FIG. 9 is only intended to schematically illustrate the connections between the various components, and typically the CPU 900, cache 920, RAM 930 and ROM 940 will not all be connected together via a single bus, but rather will be connected via a more complex interconnection of a plurality of buses.

From the above description, it will be appreciated that in accordance with preferred embodiments of the present invention, an efficient deringing adaptive filter operation is provided which is compliant with the MPEG-4 standard. Since MPEG-4 is a popular open standard, and deringing accounts for a large part of the processing requirement of the decode operation (typically between ⅓ and ½ of the total), it is clear that that technique of the present invention will enable significant increases in the efficiency of the decoding process to the realised. However, the concepts described herein are clearly not limited to MPEG-4, or indeed to image processing applications, and may be used in a variety of situations to increase the efficiency of adaptive filter operations in data processing applications.

Although particular embodiments have been described herein, it will be appreciated that the invention is not limited thereto and that many modifications and additions thereto may be made within the scope of the invention. For example, various combinations of the features of the following dependent claims can be made with the features of the independent claims without departing from the scope of the present invention.

What is claimed is:

1. A method of performing an adaptive filter operation on an input data sample to generate an output data sample, where a logical computation is performed on a logical data item to determine whether a filtering computation should be applied to the input data sample, the method comprising the steps of:
   (a) transforming the logical computation into an equivalent logical computation that incorporates the filtering computation;
   (b) storing the input data sample and the logical data item within a data word;
   (c) employing a data processing unit to apply the filtering computation to the data word, resulting in the data word containing a filtered data sample and a modified logical data item;
   (d) comparing the modified logical data item with predetermined criteria; and
   (e) outputting as the output data sample either the input data sample or a data sample derived from the filtered data sample, dependent on the comparison at said step (d).

2. A method as claimed in claim 1, wherein at said step (b) a plurality of input data samples and corresponding logical data items are stored within the data word, whereby at said step (c) the filtering computation is applied simultaneously to a plurality of input data samples.

3. A method as claimed in claim 2, wherein said steps (d) and (e) are performed independently for each data sample.

4. A method as claimed in claim 1, wherein the predetermined criteria employed at said step (d) are the maximum and minimum values that the modified logical data item may take, the data sample derived from the filtered data sample being output at said step (e) if the corresponding logical data item has either the maximum or minimum value.

5. A method as claimed in claim 1, wherein at said step (b) the input data sample and corresponding logical data item are spaced apart from each other in the data word by a predetermined number of bits to allow for their values to increase during application of the filtering computation without interacting with each other.

6. A method as claimed in claim 1, wherein the filtering computation involves application of a predetermined Finite Impulse Response (FIR) filter to the data word to generate for each input data sample a filtered data sample equivalent to the accumulation of that input data sample and adjacent data samples each multiplied by a predetermined integer coefficient.

7. A method as claimed in claim 6, wherein if at said step (d) it is determined that the filtered data sample should be used to form the output data sample, then said step (e) includes the step of generating the data sample derived from the filtered data sample by dividing the filtered data sample by a predetermined factor to correct for the use of integer coefficients in the filtering computation.

8. A method as claimed in claim 6, wherein the FIR filter is formed by a plurality of cascaded filters which are applied one after the other to the data word.

9. A method as claimed in claim 1, wherein the adaptive filter operation is applied as part of an image processing application, each input data sample representing data of an image pixel.

10. A method as claimed in claim 9, wherein the adaptive filter operation is used to perform deringing of a decompressed image to reduce compression artefacts.

11. A method as claimed in claim 10, wherein the adaptive filter operation is used to perform deringing of an MPEG-4 decompressed image, the logical data item for each input data sample being an index value generated by comparing the input data sample with a predetermined threshold value, the index value being set to a first or a second logic value dependent on the comparison.

12. A method as claimed in claim 11, wherein the data word is 32 bits long, each input data sample is 8 bits long, and each index value is 1 bit long, said step (b) comprising the storing of a first and second input data sample and their corresponding index values within the 32 bit data word, and wherein each input data sample is spaced apart from its corresponding index value in the data word by four spacing bits, with three spacing bits separating the index value of the first input data sample from the second input data sample stored in the data word.

13. A method as claimed in claim 12, wherein the spacing bits have a known value.

14. A method as claimed in claim 12, wherein the filtering computation involves application of a predetermined Finite Impulse Response (FIR) filter to the data word to generate for each input data sample a filtered data sample equivalent to the accumulation of that input data sample and adjacent data samples each multiplied by a predetermined integer coefficient, and wherein the integer coefficients used in the filtering computation are such that the filtered data samples and modified logical data items may be up to a factor of sixteen times larger than the corresponding input data samples and logical data items, the method further comprising the step of, if it is determined at said step (d) that the filtered data sample produced from the first input data sample should be output, applying an operation to correct the filtered data sample produced from the second input data sample if the modified logical data item corresponding to the first input data sample has its maximum value.

15. A data processing apparatus for performing an adaptive filter operation on an input data sample to generate an output data sample, where a logical computation is performed on a logical data item to determine whether a filtering computation should be applied to the input data sample, the logical computation being transformed into an equivalent logical computation that incorporates the filtering computation, the apparatus comprising:
   a storage for storing a data word containing the input data sample and the logical data item;
   a data processing unit for applying a sequence of data processing operations to:

(i) construct the data word containing the input data sample and the logical data item;
(ii) apply the filtering computation to the data word, resulting in the data word containing a filtered data sample and a modified logical data item;
(iii) compare the modified logical data item with predetermined criteria; and
(iv) output as the output data sample either the input data sample or a data sample derived from the filtered data sample, dependent on the comparison at said step (iii).

16. A computer program operable to configure a data processing apparatus to perform a method as claimed in claim 1.

17. A carrier medium comprising a computer program as claimed in claim 16.

* * * * *